(12) United States Patent
Lee et al.

(10) Patent No.: US 9,114,381 B2
(45) Date of Patent: Aug. 25, 2015

(54) SUPER ABSORBENT POLYMER

(71) Applicant: LG CHEM, LTD., Seoul (KR)

(72) Inventors: Hye-Min Lee, Daejeon (KR); Chang-Sun Han, Daejeon (KR); Tae-Young Won, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/401,079

(22) PCT Filed: Oct. 14, 2013

(86) PCT No.: PCT/KR2013/009162
§ 371 (c)(1),
(2) Date: Nov. 13, 2014

(87) PCT Pub. No.: WO2014/077517
PCT Pub. Date: May 22, 2014

(65) Prior Publication Data
US 2015/0099624 A1    Apr. 9, 2015

(30) Foreign Application Priority Data

Nov. 15, 2012  (KR) .................. 10-2012-0129558
Oct. 14, 2013  (KR) .................. 10-2013-0121967

(51) Int. Cl.
| | |
|---|---|
| *B01J 20/26* | (2006.01) |
| *C08J 3/24* | (2006.01) |
| *C08F 220/28* | (2006.01) |
| *C08F 20/10* | (2006.01) |
| *C08J 3/075* | (2006.01) |
| *B01J 20/28* | (2006.01) |

(52) U.S. Cl.
CPC ............ *B01J 20/265* (2013.01); *B01J 20/26* (2013.01); *B01J 20/261* (2013.01); *B01J 20/262* (2013.01); *B01J 20/267* (2013.01); *B01J 20/28004* (2013.01); *B01J 20/28016* (2013.01); *C08F 20/10* (2013.01); *C08F 220/28* (2013.01); *C08J 3/075* (2013.01); *C08J 3/24* (2013.01); *C08J 3/245* (2013.01); *B01J 2220/68* (2013.01); *C08J 2333/02* (2013.01)

(58) Field of Classification Search
CPC ................................. B01J 20/26; B01J 20/22
USPC .......................................... 502/402, 401, 526
See application file for complete search history.

(56) References Cited

U.S. PATENT DOCUMENTS

| | | |
|---|---|---|
| 5,837,789 A | 11/1998 | Stockhausen et al. |
| 6,130,304 A | 10/2000 | Sumiya et al. |
| 6,482,344 B1 | 11/2002 | Messner et al. |
| 2007/0149716 A1 | 6/2007 | Funk et al. |
| 2010/0009846 A1 | 1/2010 | Ikeuchi et al. |
| 2010/0268181 A1 | 10/2010 | Ziemer et al. |

FOREIGN PATENT DOCUMENTS

| | | |
|---|---|---|
| EP | 0317138 A2 | 5/1989 |
| EP | 1840137 B1 | 11/2009 |
| JP | 56-161408 | 12/1981 |
| JP | 57-158209 | 9/1982 |
| JP | 57-198714 | 12/1982 |
| JP | 2002-265528 A | 9/2002 |
| JP | 2003-534407 | 11/2003 |
| KR | 10-2007-0012623 A | 1/2007 |
| KR | 10-2011-0134333 | 12/2011 |
| KR | 10-2012-0055557 | 5/2012 |

*Primary Examiner* — Edward Johnson
(74) *Attorney, Agent, or Firm* — Dentons US LLP (57) ABSTRACT

The present invention relates to a super absorbent polymer. According to the present invention, provided is a super absorbent polymer which includes (meth)acrylated polyalkylene glycol on an internally crosslinked polymer inside a surface modified layer, thereby exhibiting more improved absorbency and retention capacity.

10 Claims, 2 Drawing Sheets

SUPER ABSORBENT POLYMER

This application is a National Stage Entry of International Application No. PCT/KR2013/009162, filed Oct. 14, 2013, and claims the benefit of Korean Application Nos. 10-2012-0129558, filed on Nov. 15, 2012, and 10-2013-0121967, filed Oct. 14, 2013, all of which are hereby incorporated by reference in their entirety for all purposes as if fully set forth herein.

TECHNICAL FIELD

The present invention relates to a super absorbent polymer.

BACKGROUND OF ART

A super absorbent polymer (SAP) is a synthetic polymeric material capable of absorbing moisture in about 500 to 1000 times its own weight. Various manufacturers have been denominated it as different names such as SAM (Super Absorbency Material), AGM (Absorbent Gel Material) or the like. Since super absorbent polymers started to be practically applied in sanitary products, they have been widely used for hygiene products such as disposable diapers for baby, water releasing agent for gardening, moisture resistant materials for the civil engineering and construction, cooling agents for blood or food during transportation.

The known preparation process for such super absorbent polymers includes a process by reverse phase suspension polymerization and a process by solution polymerization. The process by solution polymerization further includes a thermal polymerization method in which a water-containing gel polymer is polymerized while being broken and cooled in a kneader equipped with a plurality of shafts, and a photo-polymerization method in which an aqueous solution with a high concentration is irradiated with UV rays or the like onto a belt to be polymerized and dried at the same time.

Meanwhile, surface-treatment of the polymer powder obtained during polymerization, pulverization, drying and final pulverization processes has been attempted to obtain a water-containing gel polymer having more excellent physical properties, or modifications in various processes have been attempted to increase the efficiency of the polymerization, pulverization and drying steps.

DISCLOSURE OF INVENTION

Technical Problem

The present invention provides a super absorbent polymer showing more improved absorption rate and absorbency.

Technical Solution

According to the present invention, provided is a super absorbent polymer, including
a crosslinked polymer resulting from polymerization and internal crosslinking of acrylic acid-based monomers having acidic groups which are at least partially neutralized, and
a (meth)acrylated polyalkylene glycol present on the crosslinked polymer.

Herein, a surface modified layer may be formed on the surface of the crosslinked polymer by crosslinking, and the (meth)acrylated polyalkylene glycol might be present on the crosslinked polymer inside the surface modified layer.

In this regard, at least a part of the (meth)acrylated polyalkylene glycol might be crosslinked with the crosslinked polymer or the surface modified layer.

The (meth)acrylated polyalkylene glycol have a weight average molecular weight of 200 to 50,000.

Further, the (meth)acrylated polyalkylene glycol might be one or more selected from the group consisting of (meth)acrylated polyethylene glycol, (meth)acrylated polypropylene glycol, and (meth)acrylated polybutylene glycol.

On the other hand, the acrylic acid-based monomer may be represented by the following Chemical Formula 1.

[Chemical Formula 1]

(wherein $R^1$ is an alkyl group containing an unsaturated bond and having 2 to 5 carbon atoms, and $M^1$ is a hydrogen atom, a monovalent or divalent metal, an ammonium group, or an organic amine salt.)

Further, the super absorbent polymer according to the present invention may be a particle having a particle size of 150 to 850 μm.

Advantageous Effects

The super absorbent polymer according to the present invention includes (meth)acrylated polyalkylene glycol which is present on an internally crosslinked polymer inside a surface modified layer, thereby exhibiting more improved absorbency and retention capacity.

DETAILED DESCRIPTION OF THE EMBODIMENTS

Hereinafter, a super absorbent polymer and a preparation method thereof according to embodiments of the present invention will be described.

Unless otherwise stated explicitly throughout the specification, several terms as used herein are defined as follows.

First, 'super absorbent polymer' is a synthetic polymeric material capable of absorbing moisture in about 500 to 1000 times its own weight. For example, it might be prepared by drying and pulverizing a water-containing gel polymer to form polymer particles, and then by crosslinking the surface of the particles. Such super absorbent polymer may have a structure, in which a 'surface modified layer' is formed by surface modification of the internally 'crosslinked polymer'.

It will be understood that when a component is referred to as being "present" on another one, it can be present on the surface of or inside another component. For example, it will be understood that when a component is referred to as being "present" on the crosslinked polymer, it can be present on the surface (surface modified layer) of the crosslinked polymer or present throughout the internally crosslinked polymer inside the surface modified layer.

Further, the term '(meth)acrylated polyalkylene glycol' refers to polyalkylene glycol in which an acryl group or a methacryl group is introduced into the molecule through a substitution reaction.

While the terms including an ordinal number, such as 'first', 'second', etc., may be used herein to describe various components, such components are not limited to those terms. The terms are only to distinguish one component from another. For example, a first component may be named as a second component, and vice versa, without departing from the scope of the present invention.

Further, the term 'water content' means a content occupied by water, based on the total weight of the water-containing gel polymer, and can be calculated by subtracting the weight of the dried polymer from the weight of the water-containing gel polymer. According to one embodiment of the present invention, the water content can be defined as a value that is calculated by measuring the weight loss due to water evaporation of the polymer during a drying process of increasing the temperature of the water-containing gel polymer by infrared heating.

Further, the term 'and/or' includes any and all combinations of one or more of the associated listed items.

On the other hand, the present inventors have continued to study the super absorbent polymer, and they found that when (meth)acrylated polyalkylene glycol is present on an internally crosslinked polymer inside a surface modified layer of the super absorbent polymer, preferably, at least a part of (meth)acrylated polyalkylene glycol is crosslinked to the crosslinked polymer, or the surface modified layer, or the crosslinked polymer and the surface modified layer, the super absorbent polymer is able to exhibit more improved absorption rate and absorbency, thereby completing the present invention.

1. Super Absorbent Polymer

According to one embodiment, the present invention provides a super absorbent polymer, including a crosslinked polymer resulting from polymerization and internal crosslinking of acrylic acid-based monomers having acidic groups which are at least partially neutralized, and a (meth)acrylated polyalkylene glycol present on the crosslinked polymer.

In the super absorbent polymer according to the present invention, the crosslinked polymer is a product resulting from polymerization and crosslinking of a monomer composition containing acrylic acid-based monomers, and the surface thereof is subjected to crosslinking treatment so as to further form a surface modified layer.

Herein, the acrylic acid-based monomer as a polymerization material for the crosslinked polymer may be represented by the following Chemical Formula 1:

[Chemical Formula 1]

wherein $R^1$ is an alkyl group containing an unsaturated bond and having 2 to 5 carbon atoms, and $M^1$ is a hydrogen atom, a monovalent metal, a divalent metal, an ammonium group, or an organic amine salt.

Preferably, the acrylic acid-based monomer may be one or more selected from the group consisting of acrylic acid, methacrylic acid, and a monovalent metal salt, a divalent metal salt, an ammonium salt, and an organic amine salt thereof.

Further, the acrylic acid-based monomer has acidic groups which may be at least partially neutralized. Preferably, those partially neutralized with an alkali substance such as sodium hydroxide, potassium hydroxide, ammonium hydroxide or the like may be used.

In this regard, the acrylic acid-based monomer may have a degree of neutralization in the range of about 40 to 95 mole %, preferably about 40 to 80 mole %, and more preferably about 45 to 75 mole %. In particular, the range of the neutralization degree of the acidic group may vary depending on the final physical properties. An excessively high degree of neutralization can render most of the produced polymer soluble in water; whereas an excessively low degree of neutralization not only deteriorates the absorbency of the polymer but also endows the polymer with hard-to-handle properties, such as of elastic rubber. Therefore, it is preferred that the acidic groups are controlled to have the degree of neutralization within the above range.

Further, the acrylic acid-based monomer may be provided in the state of an aqueous solution prior to polymerization. The concentration of the monomer in such an aqueous solution is preferably about 20 to 95% by weight, and preferably about 40 to 65% by weight, which is for using the gel effect during the polymerization reaction in a high-concentration aqueous solution to eliminate a need for removing the unreacted monomer after the polymerization and also for improving pulverization efficiency upon pulverization of the polymer in the preparation process. At this time, water as a solvent is preferably used at a weight ratio of 1 to 5 times with respect to the content of the acrylic acid-based monomer, and the amount of the solvent can be determined in consideration of the polymerization heat control.

Meanwhile, the super absorbent polymer according to the present invention may be a product resulting from polymerization of the acrylic acid-based monomers in the presence of a polymerization initiator and after-mentioned (meth)acrylated polyalkylene glycol. Herein, the polymerization initiator will be described in a preparation method of the super absorbent polymer.

Meanwhile, in the polymerization of the acrylic acid-based monomer, the use of cross-linking agents is required to maintain the physical properties of the polymer produced. The cross-linking methods of the polymer include a 'simultaneous cross-linking' method that is to introduce a crosslinkage between the chains of polymers simultaneously with polymerization, and an 'after-cross-linking method' that involves a cross-linking with the functional group of the polymer after polymerization. In this regard, in order to minimize the drop of absorbency pertaining to an increase in the cross-linking density of the polymer, the use of a cross-linking agent having an appropriate chain length is preferred, which makes it possible to form an absorbent polymer with excellent absorbency as well as high gel strength.

According to the present invention, in the super absorbent polymer, a crosslinked polymer which is internally crosslinked using a first cross-linking agent is surface-crosslinked using a second cross-linking agent so as to further form a surface modified layer.

Herein, the first cross-linking agent is a cross-linking agent to cause a simultaneous cross-linking, and any divinyl compound monomer capable of introducing a crosslinkage simultaneously with polymerization is possible. Examples of the first cross-linking agent may include multifunctional cross-linking agents, such as N,N'-methylene-bis-acrylamide, trimethylolpropane tri(meth)acrylate, ethylene glycol di(meth)acrylate, polyethylene glycol (meth)acrylate, propylene glycol di(meth)acrylate, polypropylene glycol (meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentacrylate, glycerin tri(meth)acrylate, pentaerythritol tetraacrylate, triarylamine, ethylene glycol diglycidyl ether, propylene glycol, glycerin, or ethylene carbonate, which can be used alone or in combination of two or more thereof, but are not limited thereto.

Further, the second cross-linking agent used in surface-crosslinking of the internally crosslinked polymer may be any substance that reacts with the acidic group of the crosslinked polymer to form a surface-crosslinked structure. Examples of the second cross-linking agent may include glycidyl ethers or polyhydric alcohols, such as ethylene glycol diglycidyl ether, polyethylene glycol diglycidyl ether, glycerol polyglycidyl ether, propylene glycol diglycidyl ether, polypropylene glycol diglycidyl ether, ethylene glycol, diethylene glycol, propylene glycol, triethylene glycol, tetraethylene glycol, propane diol, dipropylene glycol, polypropylene glycol, glycerin, polyglycerin, butanediol, heptanediol, hexanediol, trimethylol propane, pentaerythritol, sorbitol, calcium hydroxide, magnesium hydroxide, aluminum hydroxide, iron hydroxide, calcium chloride, magnesium chloride, aluminum chloride, or iron chloride, which can be used alone or in combination of two or more thereof.

According to the present invention, the content of the first cross-linking agent is preferably 0.01 to 2 parts by weight, based on 100 parts by weight of the acrylic acid-based monomer. That is, if the content of the first cross-linking agent is less than 0.01 parts by weight, based on 100 parts by weight of the acrylic acid-based monomer, the absorption rate and the gel strength of the final super absorbent polymer may be deteriorated. If the content of the first cross-linking agent is more than 2 parts by weight, based on 100 parts by weight of the acrylic acid-based monomer, the absorbency of the super absorbent polymer may be reduced, which is undesirable as an absorbent agent.

Further, the content of the second cross-linking agent is preferably 0.001 to 5 parts by weight, based on 100 parts by weight of the crosslinked polymer. That is, an excessively low content of the second cross-linking agent cannot introduce a surface-cross-linked structure, leading to poor absorbency or low absorption rate of the super absorbent polymer, whereas an excessively high content of the second cross-linking agent can reduce the absorbency of the polymer due to excessive surface crosslinking. However, the relative amount of the first or second cross-linking agent to be used may depend on the chain length and the type of the cross-linking agent.

On the other hand, the super absorbent polymer includes (meth)acrylated polyalkylene glycol that is present on the crosslinked polymer.

The experimental results of the present inventors revealed that when (meth)acrylated polyalkylene glycol is used during preparation of the above described super absorbent polymer, the monomer composition including the acrylic acid-based monomer, the polymerization initiator, the cross-linking agent or the like has more improved dispersibility, leading to improvement in the physical properties of the final polymer product, such as absorbency.

Such (meth)acrylated polyalkylene glycol is used in the formation process of the crosslinked polymer, and thus can be present throughout the internally crosslinked polymer inside the surface modified layer. Otherwise, the (meth)acrylated polyalkylene glycol is used in the surface crosslinking process of the crosslinked polymer, and thus can be present on the surface modified layer. Otherwise, the (meth)acrylated polyalkylene glycol is used both in the formation process of the crosslinked polymer and in the surface crosslinking process thereof, and thus can be present on the crosslinked polymer and the surface modified layer at the same time. In each case, at least a part of (meth)acrylated polyalkylene glycol can be crosslinked with the crosslinked polymer and/or the surface modified layer.

Meanwhile, the (meth)acrylated polyalkylene glycol can be obtained by (meth)acrylic substitution of polyalkylene glycol, and may be a monosubstituent, disubstituent, or a mixture thereof. Preferably, the (meth)acrylated polyalkylene glycol may be one or more selected from the group consisting of (meth)acrylated polyethylene glycol, (meth)acrylated polypropylene glycol, and (meth)acrylated polybutylene glycol. Among them, (meth)acrylated polyethylene glycol is more preferred in terms of commercial production process.

According to the present invention, the addition effect of (meth)acrylated polyalkylene glycol may occur effectively regardless of its molecular weight. Therefore, the molecular weight of (meth)acrylated polyalkylene glycol is not particularly limited. However, if the weight average molecular weight of (meth)acrylated polyalkylene glycol is more than 50,000, its solubility for the monomer composition may decrease, resulting in deterioration of uniform crosslinking reaction and reduction in physical properties of the final polymer. In this connection, it is preferable that the (meth)acrylated polyalkylene glycol has a weight average molecular weight of 50,000 or less, or 200 to 50,000, or 400 to 50,000, or 400 to 40,000, or 400 to 35,000.

The super absorbent polymer of one embodiment thus obtained is able to exhibit more improved absorption under pressure together with excellent absorbency by using the first and second cross-linking agents, introducing the crosslinking structure, and using the particular (meth)acrylated polyalkylene glycol.

Such super absorbent polymer may be a particle having a particle size of about 150 to 850 μm, and therefore, which can be acquired by conducting an additional process of pulverizing and/or size-sorting before or after the surface cross-linking process.

2. Preparation Method of Super Absorbent Polymer

Meanwhile, according to another embodiment, the present invention provides a preparation method of the super absorbent polymer including the steps of:

polymerizing the monomer composition containing acrylic acid-based monomers having acidic groups which are at least partially neutralized in the presence of the polymerization initiator, the first cross-linking agent, and (meth)acrylated polyalkylene glycol so as to form a water-containing gel polymer;

drying the polymer;

pulverizing the dried polymer; and performing a surface cross-linking reaction of the pulverized polymer in the presence of the second cross-linking agent.

Hereinafter, each step included in the preparation method of the super absorbent polymer according to the embodiment will be described.

(Step of Forming the Water-Containing Gel Polymer)

According to one embodiment, the step of polymerizing and crosslinking the monomer composition containing acrylic acid-based monomers in the presence of the polymerization initiator, the first cross-linking agent, and (meth)acrylated polyalkylene glycol so as to form the water-containing gel polymer.

Herein, the acrylic acid-based monomer, a solvent, the polymerization initiator, and the first cross-linking agent may be included in the monomer composition. Further, (meth)acrylated polyalkylene glycol may be further included in the monomer composition The acrylic acid-based monomer included in the monomer composition may be represented by the following Chemical Formula 1:

[Chemical Formula 1]

wherein $R^1$ is an alkyl group containing an unsaturated bond and having 2 to 5 carbon atoms, and $M^1$ is a hydrogen atom, a monovalent metal, a divalent metal, an ammonium group, or an organic amine salt.

Preferably, the acrylic acid-based monomer may be one or more selected from the group consisting of acrylic acid, methacrylic acid, and a monovalent metal salt, a divalent metal salt, an ammonium salt, and an organic amine salt thereof. When acrylic acid or a salt thereof is used as the acrylic acid-based monomer, a super absorbent polymer having improved absorbency can be preferably obtained.

Herein, the acrylic acid-based monomer has acidic groups which may be at least partially neutralized. Preferably, those partially neutralized with an alkali substance such as sodium hydroxide, potassium hydroxide, ammonium hydroxide or the like may be used.

In this regard, the acrylic acid-based monomer may have a degree of neutralization in the range of about 40 to 95 mole %, preferably about 40 to 80 mole %, and more preferably about 45 to 75 mole %. In particular, the range of the neutralization degree may vary depending on the final physical properties. An excessively high degree of neutralization can render most of the produced polymer soluble in water; whereas an excessively low degree of neutralization not only deteriorates the absorbency of the polymer but also endows the polymer with hard-to-handle properties, such as of elastic rubber.

Further, the concentration of the acrylic acid-based monomer in the monomer composition can be properly controlled in consideration of polymerization time and reaction conditions, and may be preferably about 20 to 95% by weight, and more preferably about 40 to 65% by weight, which is for using the gel effect during the polymerization reaction in a high-concentration aqueous solution to eliminate a need for removing the unreacted monomer after the polymerization and also for improving pulverization efficiency upon pulverization of the polymer described below.

Water may be used as a solvent contained in the monomer composition and the amount of the solvent can be controlled at a weight ratio of 1 to 5 times with respect to the content of the acrylic acid-based monomer in consideration of the polymerization heat control.

Meanwhile, a polymerization initiator for polymerization of the acrylic acid-based monomers may be included in the monomer composition, and a thermal polymerization initiator or a photo-polymerization initiator may be used as the polymerization initiator depending on a polymerization method. However, even though the photo-polymerization is performed, a certain amount of heat is generated by UV irradiation or the like and is also generated with exothermic polymerization reaction. Therefore, the thermal polymerization initiator may be further included even though photo-polymerization is performed.

Herein, one or more selected from the group consisting of persulfate-based initiators, azo-based initiators, hydrogen peroxide and ascorbic acid may be used as the thermal polymerization initiator. Specific examples of the persulfate-based initiators may include sodium persulfate ($Na_2S_2O_8$), potassium persulfate ($K_2S_2O_8$), ammonium persulfate (($NH_4$)$_2S_2O_8$) or the like. Specific examples of the azo-based initiators may include 2,2-azobis(2-amidinopropane)dihydrochloride, 2,2-azobis-(N,N-dimethylene)isobutyramidine dihydrochloride, 2-(carbamoylazo)isobutylonitril, 2,2-azobis(2-[2-imidazolin-2-yl]propane)dihydrochloride, 4,4-azobis-(4-cyanovaleric acid) or the like. More various thermal polymerization initiators are well-disclosed in "Principle of Polymerization" written by Odian, (Wiley, 1981), p 203, however, they are not limited to the above described examples.

Meanwhile, one or more selected from the group consisting of benzoin ether, dialkyl acetophenone, hydroxyl alkylketone, phenyl glyoxylate, benzyl dimethyl ketal, acyl phosphine, and α-aminoketone may be used as the photo-polymerization initiator. As the specific example of acyl phosphine, commercialized Lucirin® TPO, namely, 2,4,6-trimethyl-benzoyl-trimethyl phosphine oxide, may be used. More various photo-polymerization initiators are well disclosed in "UV Coatings: Basics, Recent Developments and New Applications" written by Reinhold Schwalm, (Elsevier, 2007), p 115, however, they are not limited to the above described examples.

The amount of the polymerization initiator to be used is preferably 0.001 to 2.0 parts by weight, based on 100 parts by weight of the acrylic acid-based monomer. If the content of the polymerization initiator is less than 0.001 parts by weight, the conversion rate is low and thus a large amount of residual monomers can be undesirably extracted from the final product. If the content of the polymerization initiator is more than 2.0 parts by weight, the polymer chains constituting the network becomes short, and thus the content of water-soluble components is increased and final physical properties may deteriorate such as a reduction in absorbency under pressure.

Meanwhile, a cross-linking agent is included in the monomer composition in order to maintain physical properties of the polymer produced by polymerization of the acrylic acid-based monomers. This cross-linking agent is the first cross-linking agent (internal cross-linking agent) for internal crosslinking of the water-containing gel polymer, and used independently of the second cross-linking agent (surface cross-linking agent) for further crosslinking of the surface of the water-containing gel polymer. Specific types and contents of the first and second cross-linking agents are the same as described above.

Meanwhile, according to one embodiment of the present invention, the step of forming the water-containing gel polymer may be performed in the presence of (meth)acrylated polyalkylene glycol. That is, (meth)acrylated polyalkylene glycol may be added to the monomer composition.

The experimental results of the present inventors revealed that when (meth)acrylated polyalkylene glycol is used in the step of forming the water-containing gel polymer, the monomer composition including the acrylic acid-based monomer, the polymerization initiator, the first cross-linking agent or the like has more improved dispersibility, leading to more uniform polymerization and crosslinking of the resulting polymer and improvement in the physical properties of the final polymer product, such as absorbency.

Herein, the (meth)acrylated polyalkylene glycol can be obtained by (meth)acrylic substitution of polyalkylene glycol, and the acrylic substitution of polyalkylene glycol can be performed by the typical method known in the art pertaining to the present invention, and thus the method is not particularly limited. Specific type, molecular weight and content of the (meth)acrylated polyalkylene glycol are the same as described above.

On the other hand, as the method for forming the water-containing gel polymer by polymerizing and crosslinking the monomer composition, the typical method known in the art pertaining to the present invention can be applied without limitation in the constitution thereof. For example, the polymerization method is largely classified into the thermal polymerization and the photo-polymerization according to the polymerization energy source, and the thermal polymerization may be carried out in a reactor like a kneader equipped with agitating spindles and the photo-polymerization may be carried out in a reactor equipped with a movable conveyor belt.

According to one embodiment of the present invention, the monomer composition is injected to a reactor like a kneader equipped with the agitating spindles, and thermal polymerization is performed by providing hot air thereto or heating the reactor so as to obtain the water-containing gel polymer. At this time, the water-containing gel polymer may have the size of centimeters or millimeters when it is discharged from the outlet of the reactor, according to the type of agitating spindles equipped in the reactor. For example, the water-containing gel polymer may be obtained in various forms according to the concentration of the monomer composition fed thereto, the feeding speed or the like, and the water-containing gel polymer having a (weight) particle diameter of 2 to 50 mm can be generally obtained.

According to another embodiment of the present invention, when the photo-polymerization of the monomer composition is carried out in a reactor equipped with a movable conveyor belt, the water-containing gel polymer may be obtained in a sheet-type (hereinafter, referred to as polymer sheet). At this time, the thickness of the polymer sheet may vary according to the concentration of the monomer composition fed thereto and the feeding speed, and the polymer sheet is preferably controlled to have a thickness of 0.5 to 5 cm in order to uniformly polymerize the entire sheet and secure production speed.

At this time, the method is performed such that the water content of the polymer formed in the step of forming the water-containing gel polymer is 40 to 80% by weight. In terms of optimization of the efficiency of the drying step described below, it is preferable that the polymer thus formed is controlled to have the water content within the above range.

(Step of Drying the Water-Containing Gel Polymer)

Meanwhile, according to one embodiment, the step of drying the water-containing gel polymer can be performed.

However, if necessary, a step of pulverizing the water-containing gel polymer may be performed before the drying step, in order to increase the efficiency of the drying step. At this time, a pulverizing device applicable may be exemplified by a vertical pulverizer, a turbo cutter, a turbo grinder, a rotary cutter mill, a cutter mill, a disc mill, a shred crusher, a crusher, a chopper, a disc cutter or the like, but the constitution is not particularly limited.

As such, when the step of pulverizing the water-containing gel polymer may be performed before the drying step, the polymer may stick to the surface of the pulverizing device because it has high water content. Accordingly, in order to minimize this phenomenon, an anti-agglomeration agent for the fine powder such as steam, water, a surfactant, clay or silica or the like; a thermal polymerization initiator such as a persulfate-based initiator, an azo-based initiator, hydrogen peroxide, ascorbic acid or the like; or a cross-linking agent such as an epoxy-based cross-linking agent, a diol-based cross-linking agent, a cross-linking agent including 2-functional or 3 or more-functional acrylate, a mono-functional compound including a hydroxyl group may be added during the pulverization step.

This pulverization step is performed to make the water-containing gel polymer have a particle diameter of 2 to 10 mm. That is, it is preferable that the water-containing gel polymer is pulverized to have a particle diameter of 10 mm or less for efficiency improvement in the subsequent drying step. Excessive pulverization may cause agglomeration between particles. In order to prevent the agglomeration, it is preferable that the polymer is pulverized into particles having a particle diameter of 2 mm or more.

Immediately after pulverization or polymerization, the water-containing gel polymer is subjected to the drying step, and the drying step may be performed at a temperature of 150 to 250° C., and preferably 160 to 200° C. (in this regard, the drying temperature means the temperature of the heating medium provided thereto for drying, or the temperature of the drying reactor including the heating medium and the polymer during the drying process). That is, if the drying temperature is low, and therefore the drying time becomes long, the properties of the final super absorbent polymer may be deteriorated. In order to prevent this problem, the drying temperature is preferably 150° C. or higher. In addition, the drying temperature is higher than necessary, only the surface of the water-containing gel polymer is dried, and thus there is a concern that fine powder may be generated in the pulverization process described below, and the properties of the final super absorbent polymer may be deteriorated. In order to prevent this problem, the drying temperature is preferably 250° C. or lower.

In this regard, the drying time of the drying step is not particularly limited, but it may be performed at the above drying temperature for 20 to 90 minutes, considering the process efficiency.

Furthermore, as long as a drying method of the drying step can be typically used in the drying process of the water-containing gel polymer, it can be applied without limitation in the constitution thereof. Specifically, a method of supplying hot air, irradiating infrared rays, irradiating microwaves, irradiating ultraviolet rays or the like can be applied to the drying step.

This drying step can be performed to make the dried polymer have the water content of 0.5 to 10% by weight. That is, if the water content of the polymer is less than 0.5% by weight, production costs may be increased due to excessive drying and degradation of the crosslinked polymer may occur, which is undesirable. If the water content of the polymer is more than 10% by weight, defective products can be produced in the subsequent process. In this regard, it is preferable that the water content of the dried polymer is within the above range.

(Step of Pulverizing the Dried Polymer)

Meanwhile, according to one embodiment, the step of pulverizing the dried water-containing gel polymer can be performed.

The pulverization step is a step of optimizing the surface area of the dried water-containing gel polymer, and the step is performed to make the pulverized polymer have a particle diameter of 150 to 850 μm. At this time, examples of the usable pulverization device may include a pin mill, a hammer mill, a screw mill, a roll mill, a disc mill, a jog mill or the like, but the constitution thereof is not particularly limited.

Further, as the water-containing gel polymer formed and dried according to one embodiment is pulverized in the pulverization step, the amount of the powder produced in the pulverization step may be controlled to be less than 5% of the polymer weight before pulverization.

According to the present invention, a step of size-sorting the polymer powder obtained through the process into the polymer having a particle diameter of 150 to 850 μm may be further performed. This step is an additional step for managing physical properties of the super absorbent polymer powder finally produced, and the polymer having the diameter particle within the above range can be sorted before use.

(Step of Surface-Crosslinking Pulverized Polymer)

Meanwhile, according to one embodiment, the step of surface-crosslinking the pulverized polymer in the presence of the second cross-linking agent can be performed.

This step is a step of further improving physical properties of the super absorbent polymer by surface-crosslinking the polymer which is dried and pulverized as described above. A surface modified layer can be formed on the water-containing gel polymer described in the above steps by surface-crosslinking. Herein, as long as the second cross-linking agent is a compound that can be reacted with the functional group of the polymer, it can be used without limitation in the constitution thereof.

Meanwhile, in order to perform the surface-crosslinking reaction, a method of feeding the second cross-linking agent and the pulverized polymer to the reactor and mixing them, a method of spraying the second cross-linking agent to the pulverized polymer, or a method of mixing the pulverized polymer and the second cross-linking agent while continuously feeding them to a mixer being continuously operated may be used.

At this time, the second cross-linking agent may be added with additional water. When the second cross-linking agent is added together with water, the second cross-linking agent can be evenly dispersed, agglomeration of the polymer powder can be prevented, and the penetrating depth of the second cross-linking agent into the polymer powder can be optimized. Considering these purposes, the amount of water added thereto is preferably 0.5 to 10 parts by weight based on 100 parts by weight of the polymer.

The surface crosslinking reaction step may be performed at a temperature of 100 to 250° C. subsequently after the drying and pulverization steps which are performed at a relatively high temperature, and in order to shorten the processing time, it may be performed within the above temperature range. At this time, the surface crosslinking reaction may be performed for 1 to 120 minutes, preferably 1 to 100 minutes, and more preferably 10 to 60 minutes. That is, in order to induce the minimal surface crosslinking reaction and to prevent a reduction in physical properties due to deterioration in the polymer particles during excessive reaction, the surface crosslinking reaction may be performed under the above described reaction conditions.

According to this method, a super absorbent polymer showing low fine powder generation and having excellent water holding capacity and absorbency under pressure while having a low content of water-soluble component can be prepared.

Hereinafter, the preferred Examples are provided for better understanding. However, these Examples are for illustrative purposes only, and the present invention is not intended to be limited by these Examples.

Preparation Example 1

Acrylic substitution of polyethylene glycol was performed in the following manner to prepare acrylated polyethylene glycol.

At first, 20 g of polyethylene glycol having 20,000 g/mol of the average molecular weight was added to a flask with 200 ml of anhydrous benzene. After, polyethylene glycol was fully dissolved in benzene at 50° C. under nitrogen atmosphere, 0.14 ml of triethylamine (TEA) and 0.28 ml of acryloyl chloride were slowly added dropwise to a polyethylene glycol solution under stirring. Subsequently, a mixture was heated at a temperature of 80° C., and stirred for 2 hours. And then, the mixture was stirred under nitrogen atmosphere and at a room temperature for about 12 hours.

Thereafter, amine salt was removed by filtration using a Buchner funnel, and acrylated polyethylene glycol was precipitated using 2 L of hexane. The precipitated acrylated polyethylene glycol was filtered, and then dried in a vacuum oven at about 40° C. for about 12 hours.

Figure 1:
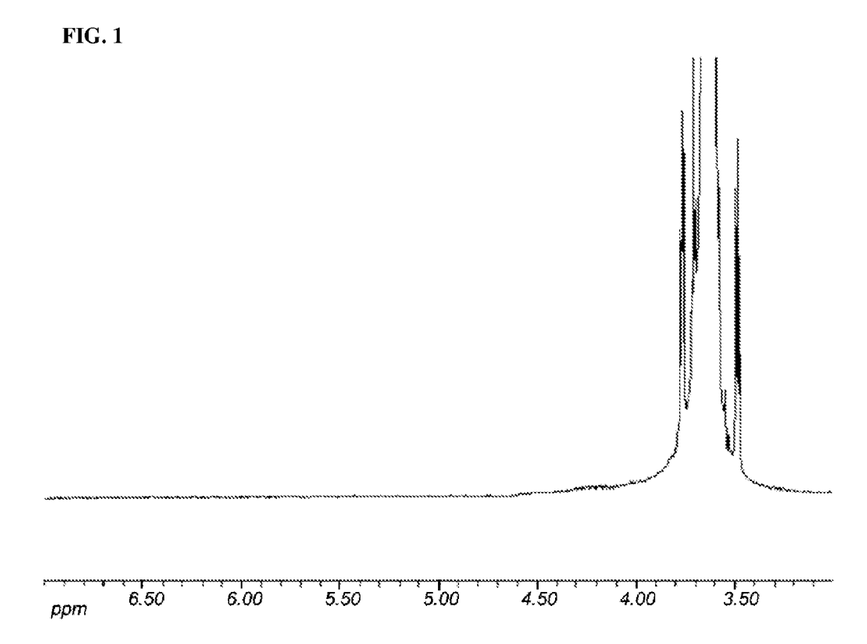
FIG. 1 is a graph showing the result of proton nuclear magnetic resonance of polyalkylene glycol used in one Comparative Example of the present invention.
Figure 2:
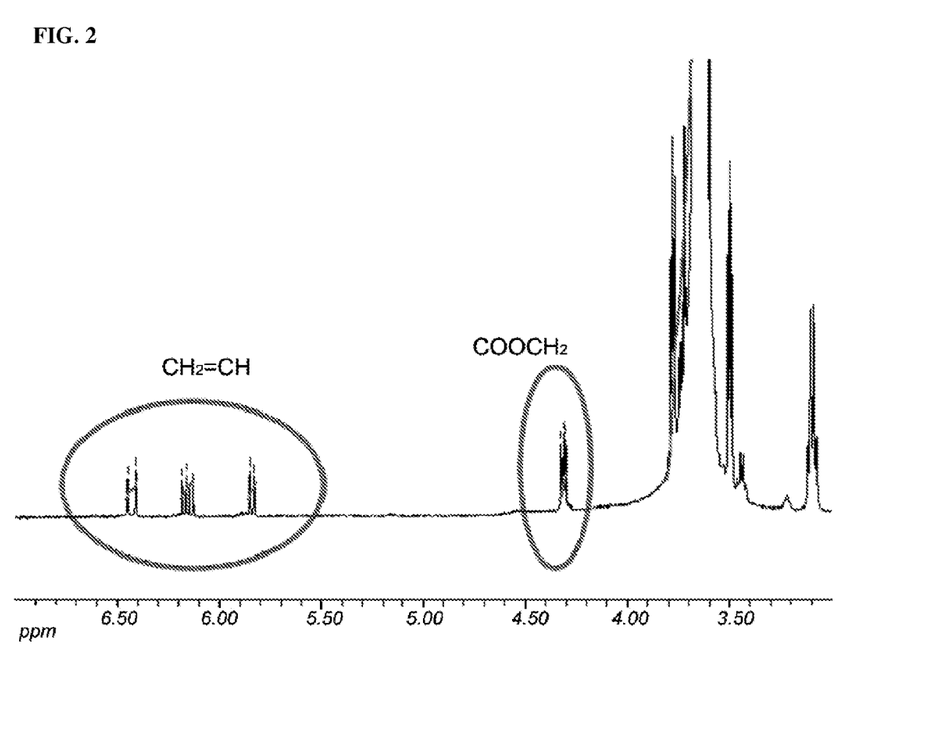
FIG. 2 is a graph showing the result of proton nuclear magnetic resonance of (meth)acrylated polyalkylene glycol used in one Example of the present invention.

The result of proton nuclear magnetic resonance of polyethylene glycol prior to acrylation was shown in FIG. 1, and the result of proton nuclear magnetic resonance of acrylated polyethylene glycol after acrylation was shown in FIG. 2. As shown in FIGS. 1 and 2, it was found that polyalkylene glycol was acrylated by the method.

Preparation Example 2

Acrylated polyethylene glycol was obtained under the same condition as shown in Preparation Example 1, except using polyethylene glycol having 4,500 g/mol of the average molecular weight instead of polyethylene glycol having 20,000 g/mol of the average molecular weight.

Preparation Example 3

Acrylated polyethylene glycol was obtained under the same condition as shown in Preparation Example 1, except using polyethylene glycol having 600 g/mol of the average molecular weight instead of polyethylene glycol having 20,000 g/mol of the average molecular weight.

Preparation Example 4

Methacrylated polyethylene glycol was obtained under the same condition as shown in Preparation Example 1, except adding methacryloyl chloride instead of acryloyl chloride.

Example 1

1.0 g of N,N'-methylene-bis-acrylamide as an internal cross-linking agent was mixed with 500 g of acrylic acid. Then, 971.4 g of 20 wt % sodium hydroxide aqueous solution was added to prepare a water-soluble unsaturated monomer aqueous solution (degree of neutralization of acrylic acid-based monomer: 70 mole %).

The water-soluble unsaturated monomer aqueous solution was fed into a 5 L twin-armed kneader equipped with a sigma-type axis, maintained at 40° C. and purged with nitrogen gas for 30 minutes to eliminate oxygen dissolved in the aqueous solution. While stirred, 50.1 g of 0.2 wt % L-ascorbic acid aqueous solution, 50.5 g of a sodium persulfate aqueous solution, 51.0 g of 2.0 wt % hydrogen peroxide aqueous solution and 3 g of acrylated polyethylene glycol according to Preparation Example 1 were added. The polymerization reaction was initiated within 20 minutes, and the gel was finely divided by way of shear force for 30 minutes.

The gel was spread as thick as about 30 mm on a stainless wire gauze having a hole size of 600 μm and dried in a hot air oven at 140° C. for 5 hours. The dried gel was pulverized with a grinder and then size-sorted through an ASTM standard sieve. After that, we obtained a crosslinked polymer having a particle size of 150 to 850 μm.

For surface modification of the crosslinked polymer, 100 g of the crosslinked polymer was uniformly blended with a mixture of 0.3 g of ethylene glycol diglycidyl ether as surface cross-linking agent, 3.0 g of methanol, and 3.0 g of water. And then they dried out in a hot air oven at 140° C. for 30 minutes. The dry powder was size-sorted through an ASTM standard sieve. We obtained dried powder having a particle size of 150 to 850 μm.

Example 2

Dried powder was obtained under the same condition as shown in Example 1, except adding the same amount of acrylated polyethylene glycol according to Preparation Example 2 instead of acrylated polyethylene glycol according to Preparation Example 1.

Example 3

Dried powder was obtained under the same conditions as shown in Example 1, except for adding the same amount of acrylated polyethylene glycol according to Preparation Example 3 instead of acrylated polyethylene glycol according to Preparation Example 1.

Example 4

Dried powder was obtained under the same condition as shown in Example 1, except for adding the same amount of (meth)acrylated polyethylene glycol according to Preparation Example 4 instead of acrylated polyethylene glycol according to Preparation Example 1.

Comparative Example 1

Dried powder was obtained under the same condition without acrylated polyethylene glycol as shown in Example 1.

Comparative Example 2

Dried powder was obtained under the same condition as shown in Example 1, except adding the same amount of polyethylene glycol with 20,000 g/mol of the average molecular weight instead of the acrylated polyethylene glycol according to Preparation Example 1.

Comparative Example 3

Dried powder was obtained under the same condition as shown in Example 1, except adding the same amount of polyethylene glycol with 600 g/mol of the average molecular weight instead of the acrylated polyethylene glycol according to Preparation Example 1.

Experimental Example

To evaluate absorption properties of the super absorbent polymers prepared in Examples and Comparative Examples, the following experiments were performed and the results are shown in the following Table 1.

(1) Centrifugal Retention Capacity (CRC)

CRC was measured in accordance with EDANA method WSP 241.2.

W (g) (0.2 g) of each powder was uniformly placed into a non-woven bag, and then immersed in a saline solution (0.9% by weight) at room temperature. After 30 minutes, residual water was drained by centrifugal device under the condition of 250 G for 3 minutes, and then, the weight W2 (g) of the bag was measured. In addition, the same manipulation was performed without super absorbent polymer, and the measured weight W1 (g) of empty bag as a reference. CRC (g/g) were calculated by following equation:

$$CRC\ (g/g) = \{(W2 - W1 - W)/W\} \quad \text{[Mathematical Equation 1]}$$

wherein W represents the weight of dried powder,

W1 represents the weight of the absorbent polymer which was measured after a non-woven bag containing no absorbent polymer was immersed in a saline solution at room temperature for 30 minutes, and dehydrated using a centrifuge at 250 G for 3 minutes, and W2 represents the weight of the absorbent polymer which was measured after a non-woven bag containing an absorbent polymer was immersed in a saline solution for 30 minutes, and dehydrated using a centrifuge at 250 G for 3 minutes.

(2) Residual Monomers (RM)

Contents of residual monomers in the super absorbent polymers of Examples and Comparative Examples were measured in accordance with EDANA method WSP 210.3.

1 g of each polymer W (g) was placed in a flask containing 100 g of saline solution (0.9 wt %) and agitated at a speed of 250±50 rpm/min for 1 hour. After 1 hour, the flask was left for about 5 minutes to make the swollen polymer sink. A portion of the supernatant was taken and filtered through a filter having a pore size of 0.45 μm, and 10 to 100 μl thereof was taken for HPLC analysis. The contents of residual acrylic acid monomers were determined by a calibration curve over concentration.

(3) Absorbency Under Pressure (AUP)

AUP of the super absorbent polymers of Examples and Comparative Examples was measured in accordance with EDANA method WSP 242.3.

That is, 400 metal mesh made of stainless steel was installed at the bottom of a plastic cylinder having an inner diameter of 60 mm. 0.90 g of the super absorbent polymer was uniformly spread on the metal mesh at room temperature and humidity of 50%. A piston to uniformly apply a load of 4.83 kPa (0.7 psi) was mounted thereon, in which the piston had an outer diameter of only a little smaller than 60 mm and made no gap with the inner wall surface of the cylinder, but was not hindered from moving up and down. At this time, the weight Wa (g) of the apparatus was measured.

A glass filter having a diameter of 90 mm and a thickness of 5 mm was mounted inside a Petri dish having a diameter of 150 mm, and then a physiological saline consisting of 0.9 wt % sodium chloride was added up to the same level as the top of the glass filter, on which a filter paper having a diameter of 90 mm was then mounted. The measurement apparatus was mounted on the filter paper, thereby getting the liquid absorbed under the load for 1 hour. 1 hour later, its weight Wb (g) of the whole apparatus was measured.

The absorbency under pressure (g/g) was calculated from Wa and Wb in accordance with the following equation.

$$AUP\ (g/g) = (Wb - Wa)/(\text{weight of absorbent polymer, g}) \quad \text{[Mathematical Equation 2]}$$

TABLE 1

| | CRC(g/g) | Residual monomers (ppm) | Absorbency under pressure (g/g) |
|---|---|---|---|
| Example 1 | 33.6 ± 0.3 | 648 | 24.2 |
| Example 2 | 32.2 ± 0.3 | 610 | 23.3 |
| Example 3 | 32.5 ± 0.3 | 615 | 25 |
| Example 4 | 32.7 ± 0.3 | 640 | 24.5 |
| Comparative Example 1 | 31.5 ± 0.3 | 728 | 22.7 |
| Comparative Example 2 | 33.4 ± 0.2 | 644 | 23.4 |
| Comparative Example 3 | 32.8 ± 0.2 | 625 | 24.2 |

As shown in Table 1, it was found that the super absorbent polymers of Examples 1 to 4 containing (meth)acrylated polyalkylene glycol on the crosslinked polymer have lower content of residual monomers and absorbency equivalent to or higher than those of the polymer of Comparative Example 1 containing no (meth)acrylated polyalkylene glycol and the polymers of Comparative Examples 2 and 3 containing non-methacrylated polyalkylene glycol.

The invention claimed is:

1. A super absorbent polymer, comprising
a crosslinked polymer resulting from polymerization and internal crosslinking of acrylic acid-based monomers having acidic groups which are at least partially neutralized, and
a (meth)acrylated polyalkylene glycol present on the crosslinked polymer.

2. The super absorbent polymer according to claim 1, wherein a surface modified layer is formed on the surface of the crosslinked polymer by crosslinking, and the (meth)acrylated polyalkylene glycol is present on the crosslinked polymer inside the surface modified layer.

3. The super absorbent polymer according to claim 2, wherein at least a part of the (meth)acrylated polyalkylene glycol is crosslinked with the crosslinked polymer or the surface modified layer.

4. The super absorbent polymer according to claim 1, wherein the (meth)acrylated polyalkylene glycol has a weight average molecular weight of 200 to 50,000.

5. The super absorbent polymer according to claim 1, wherein the (meth)acrylated polyalkylene glycol is one or more selected from the group consisting of (meth)acrylated polyethylene glycol, (meth)acrylated polypropylene glycol, and (meth)acrylated polybutylene glycol.

6. The super absorbent polymer according to claim 1, wherein the acrylic acid-based monomer is represented by the following Chemical Formula 1:

$$R^1-COOM^1 \quad \text{[Chemical Formula 1]}$$

(wherein $R^1$ is an alkyl group containing an unsaturated bond and having 2 to 5 carbon atoms, and $M^1$ is a hydrogen atom, a monovalent or divalent metal, an ammonium group, or an organic amine salt).

7. The super absorbent polymer according to claim 1, wherein the acrylic acid-based monomer is one or more selected from the group consisting of acrylic acid, methacrylic acid, and a monovalent metal salt, a divalent metal salt, an ammonium salt, and an organic amine salt thereof.

8. The super absorbent polymer according to claim 1, wherein the crosslinked polymer is internally crosslinked by one or more first cross-linking agents selected from the group consisting of N,N'-methylene-bis-acrylamide, trimethylolpropane tri(meth)acrylate, ethylene glycol di(meth)acrylate, polyethylene glycol (meth)acrylate, propylene glycol di(meth)acrylate, polypropylene glycol (meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentacrylate, glycerin tri(meth)acrylate, pentaerythritol tetraacrylate, triarylamine, ethylene glycol diglycidyl ether, propylene glycol, glycerin, and ethylene carbonate.

9. The super absorbent polymer according to claim 2, wherein the crosslinked polymer is surface-crosslinked by one or more second cross-linking agents selected from the group consisting of ethylene glycol diglycidyl ether, polyethylene glycol diglycidyl ether, glycerol polyglycidyl ether, propylene glycol diglycidyl ether, polypropylene glycol diglycidyl ether, ethylene glycol, diethylene glycol, propylene glycol, triethylene glycol, tetraethylene glycol, propane diol, dipropylene glycol, polypropylene glycol, glycerin, polyglycerin, butanediol, heptanediol, hexanediol, trimethylol propane, pentaerythritol, sorbitol, calcium hydroxide, magnesium hydroxide, aluminum hydroxide, iron hydroxide, calcium chloride, magnesium chloride, aluminum chloride, and iron chloride.

10. The super absorbent polymer according to claim 1, wherein the super absorbent polymer is a particle having a particle size of 150 to 850 μm.

* * * * *